United States Patent [19]

Kyoden

[11] Patent Number: 4,816,662
[45] Date of Patent: Mar. 28, 1989

[54] REMOTE CONTROL SWITCH FOR POSTURE ADJUSTMENT OF AUTOMOTIVE MIRRORS

[75] Inventor: Tatsuo Kyoden, Isehara, Japan

[73] Assignee: Ichikoh Industries Limited, Tokyo, Japan

[21] Appl. No.: 82,348

[22] Filed: Aug. 6, 1987

[30] Foreign Application Priority Data

Aug. 7, 1986 [JP] Japan .............................. 61-120367[U]
Jul. 28, 1987 [JP] Japan .............................. 62-114584[U]
Jul. 28, 1987 [JP] Japan .............................. 62-114585[U]

[51] Int. Cl.$^4$ ............................................. H01H 3/02
[52] U.S. Cl. ............................... 200/5 R; 200/16 R; 200/16 C; 200/277; 200/DIG. 29
[58] Field of Search .............. 200/5 R, 6 A, DIG. 29, 200/1 V, 277, 275, 16 R, 16 C

[56] References Cited

U.S. PATENT DOCUMENTS

| | | | |
|---|---|---|---|
| 3,032,620 | 5/1962 | Siiberg | 200/277 X |
| 4,330,694 | 5/1982 | Ogawa | 200/6 A |
| 4,698,463 | 10/1987 | Tanaka et al. | 200/5 R |
| 4,698,464 | 10/1987 | Tanaka et al. | 200/5 R |

Primary Examiner—A. D. Pellinen
Assistant Examiner—Morris Ginsburg
Attorney, Agent, or Firm—Foley & Lardner, Schwartz, Jeffery, Schwaab, Mack, Blumenthal & Evans

[57] ABSTRACT

A remote control switch for posture adjustment of automotive mirrors comprises plural fixed contact groups each having a first to third fixed contacts formed on both sides of a substrate and plural pairs of moving contacts disposed corresponding to the fixed contact groups, respectively. Each of the moving contact pairs consists of two electrically-conductive rolling elements movable on the substrate while being so kept by slidable actuating members disposed correspondingly to each moving contact pair. Each of the actuating members are forced by a resilient member disposed correspondingly to the actuating member in a direction where each moving contact pair takes a first contact position in which it is put into contact with the first and second fixed contacts. When each of the actuating member is slid in an opposite direction to the force of each resilient member, each moving contact pair takes a second contact position where the moving contacts in the pair are put into contact with the second and third fixed contacts. The sliding actuating members are moved by a rotary cam which acts on each actuating end protruding in the direction of the force of each resilient member having axis of rotation parallel to the length of the substrate and/or or as a switching disk disposed slidably in a plane perpendicular to the substrate and which has slopes acting on the actuating ends. The rotary cam or switching disk is rotated or slid by a single operating shaft.

10 Claims, 12 Drawing Sheets

Fig. 26

| Position \ Terminal | | A | B | D | E | C | H | G | F |
|---|---|---|---|---|---|---|---|---|---|
| Left-side Mirror | UP | o—|—o | | | o—|—o | o—|—o |
| | DOWN | o— | | | | o—|—o | o | —o |
| | CTR OFF | o—|—o | | | o—|—o | o—|—o |
| | LEFT | o—|—o | | | o—|—o | o—|—o |
| | RIGHT | | o— | | | o—|—o | o | —o |
| Right-side Mirror | UP | | | o—|—o | o | | o—|—o |
| | DOWN | | | o— | | o—|—o | o | —o |
| | CTR OFF | | | o—|—o | o | o—|—o |
| | LEFT | | | o—|—o | o—|—o | o—|—o |
| | RIGHT | | | | o— | o—|—o | o—|—o |

REMOTE CONTROL SWITCH FOR POSTURE ADJUSTMENT OF AUTOMOTIVE MIRRORS

BACKGROUND OF THE INVENTION (a) Field of the Invention

The present invention relates to a remote control switch destined for adjusting the posture of the mirror surface of a mirror provided at either side of an automobile.

(b) Related Art Statement

Heretofore, there have been proposed various types of remote control switch for automotive motor-driven mirrors, including, for example, one comprising plural fixed contacts disposed on a printed circuit board (will be referred to as "PCB" hereinafter), plural bridge-shaped resilient moving contacts disposed slidably on a PCB to electrically connect certain ones of the fixed contacts to each other, and a push plate having plural acting ends disposed correspondingly to the moving contacts and which press the respective moving contacts in a direction perpendicular to the PCB to resiliently deform them, thereby connecting the certain fixed contacts to each other. This type of switch is a so-called push plate type switch, which is disclosed, for example, in the U.S. Pat. No. 4,698,464, issued Oct. 6, 1987, and U.S. Pat. No. 4,698,463, issued Oct. 6, 1987.

In the control switches of this type, the bridge-shaped moving contacts are so formed as to slide on the PCB. Each acutating end causing each moving contact to slide by resiliently deforming the latter is so formed as to be moved perpendicularly to the PCB. Therefore, each moving contact slides on the PCB with a surface contact between each moving contact and the PCB and also between each moving contact and each fixed contact, which causes a problem that each moving contact and each fixed contacts are easily abraded and set in fatigue.

Furthermore, such control switches are provided with a switch to select either of the right and left mirrors for adjustment and a switch to adjust the posture of the selected mirror by tilting and pivoting it, namely, a so-called four-way posture control switch. The operating member of the mirror select switch is formed as a knob independent of a push plate being the operating member of the four-way posture control switch. The fact is that the driver operating this control switch should first tilt the mirror select switch knob rightward or leftward to select the right left mirror, and then adjust the posture of the mirror by pressing the push plate. Thus, the driver must pay attention to both the mirror select switch knob and the push plate surrounding it. Especially when such mirror posture adjustment is required during car driving, it is not preferrable for a safe drive.

The PCB on which plural fixed contacts are formed is secured to the bottom of a box-shaped casing, and the push plate is disposed covering the top opening in the casing, so that the cross sectional area of the casing as the switch body substantially depends upon the area of the push plate or that of the PCB. The push plate must be so designed as to have a somewhat large area because its operability is not good if it is designed extremely small. Thus in a dashboard, console or arm reset in which such control switch is fixed, the push plate and the top portion of the casing are exposed on the surface of the dashboard or the like, so that the exposed portion has a large area, the place of installation is limited and a special means of sealing is necessary for preventing dust or any liquid from entering the casing.

SUMMARY OF THE INVENTION

The present invention seeks to overcome the above-mentioned drawbacks of the push plate type switch by providing an improved and novel control switch of a high operability.

According to another aspect of the present invention, a control switch is provided of which the moving and fixed contacts are little abraded, each of the moving contacts being composed of two rolling, electrically conductive members.

According to a still another aspect of the present invention, a control switch in which an actuating member of a switch to select either of the right and left mirrors for adjustment of posture and an actuating member of a four-way posture control switch to adjust the posture of the select mirror by tilting and pivoting it can be formed by a common operating shaft, the operability of the control switch being extremely high.

According to a yet another aspect of the present invention, a compact control switch is provided of which the body is a casing of a small cross sectional area.

These and other objects and advantages of the present invention will be better understood from the ensuing description made by way of example of the embodiments according to the present invention with respect to the drawings.

BRIEF DESCRIPTION OF THE DRAWINGS

FIG. 26 is a table explaining the operation of the circuit shown in FIG. 24, showing the connections between the terminals.

DETAILED DESCRIPTION OF THE PREFERRED EMBODIMENTS

Figure 1:
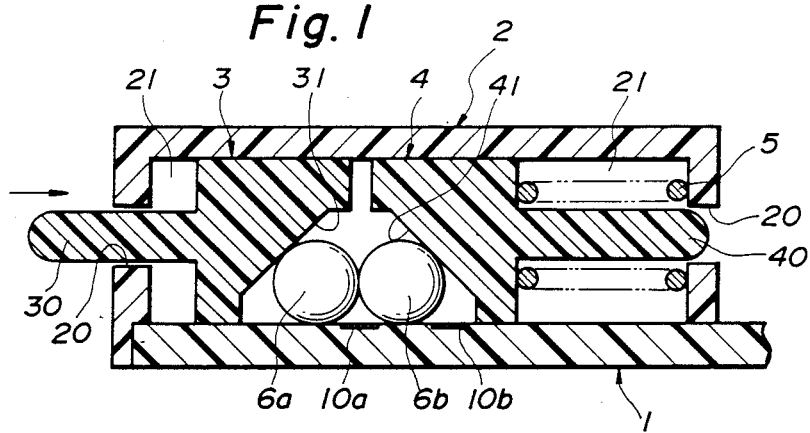
FIG. 1 is a schematic sectional view of a switch unit for explanation of the principle of operation of the control switch according to the present invention.
Figure 2:
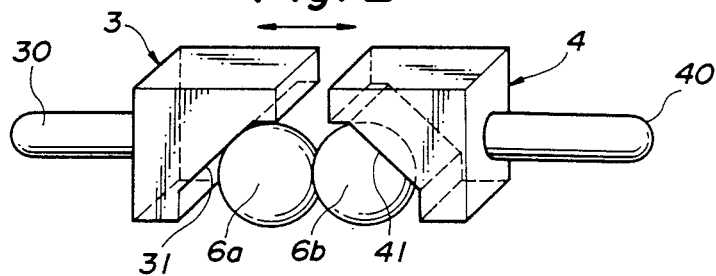
FIG. 2 is a perspective view of the switch unit in FIG. 1 showing the moving contacts and sliders.

Referring now to FIG. 1, there is shown a switch unit forming a part of control switch according to the present invention.

In this Figure, the reference numeral 1 indicates a substrate formed by, for example, a printed circuit board (PCB). There are formed fixed rectangular contacts 10a and 10b as spaced on one of the surfaces of the substrate 1.

The numeral 2 indicates an enclosure installed to the substrate 1 covering the fixed contacts 10a and 10b and which has a hollow rectangular parallelepiped opening at the bottom thereof. The enclosure 2 has formed through-holes 20 at opposite ends thereof. The substrate 1 and enclosure 2 define together a rectangular parallelepiped space 21.

The reference numerals 3 and 4 indicate a first and second sliders so housed opposite to each other in the space 21 defined by the above-mentioned substrate 1 and enclosure 2 that they are slidable longitudinally of the space 21. The first slider 3 and second slider 4 are made of an insulative material, of which the axial section is a rectangle nearly equal to or less than the axial section of the aforementioned space 21, and they are provided integrally at the outer sides thereof opposite to the face-to-face inner sides thereof with projections 30 and 40, respectively, extending outwardly and which are inserted in the through-holes 20, respectively, in the enclosure 2. The first and second sliders 3 and 4 have formed slopes 31 and 41, respectively, from their face-to-face inner sides to the bottoms thereof.

The reference numeral 5 indicates a return compression coil spring fitted on the projection 40 of the aforementioned second slider 4 and which is interposed between the outer side of the second slider 4 and the inner wall of the enclosure 2 to normally force the first and second sliders 3 and 4 in a direction opposite to the arrow in FIG. 1 and returns the sliders 3 and 4 to their initial positions. These sliders 3 and 4 are the operating members of the switch unit.

The reference numerals 6a and 6b indicate moving contacts in pair. These moving contacts 6a and 6b are made of an electrically conductive material. They take the form of a small ball having a smooth surface and of which the diameter is less than the width of the aforementioned space 21. This pair of moving contacts 6a and 6b is rollably housed in a generally trapezoidal space defined by the above-mentioned slope 31 of the first slider 3, the slope 41 of the second slider 41 and the upper surface of the substrate 1. These moving contacts 6a and 6b in pair are kept in contact with each other by the aforementioned operating members and can be rolled longitudinally of the space 21 as guided by the enclosure 2. Note that since the moving contacts 6a and 6b in pair are placed between the first and second sliders 3 and 4, there is defined a small clearance between the inner sides of the sliders. When the projection 30 of the first slider 3 is pushed, the moving contacts 6a and 6b are put into contact with the fixed contacts 10a and 10b, respectively. When the pressing force is reduced, the first and second sliders 3 and 4 are slid in a direction opposite to that of the arrow under the resilience of the compression coil spring 5 so that the above-mentioned contact between the moving and fixed contacts is eliminated.

Figure 3:
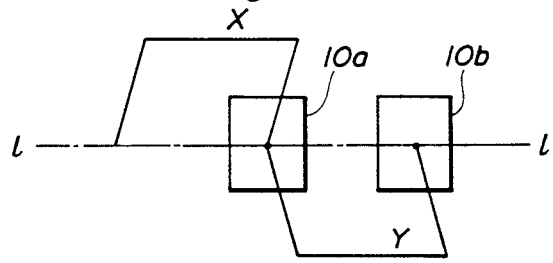
FIG. 3 explains the circuit configuration of the switch unit in FIG. 1.

FIG. 3 shows a simple circuit diagram of the switch unit having been described above, and FIG. 4 also shows a simple circuit diagram of a switch unit in which three fixed contacts 10a, 10b and 10c are used. The functions of these circuits of the switch units will be described herebelow but the means of pressing the first slider 3 in the direction of arrow will not be illustrated.

Figure 4:
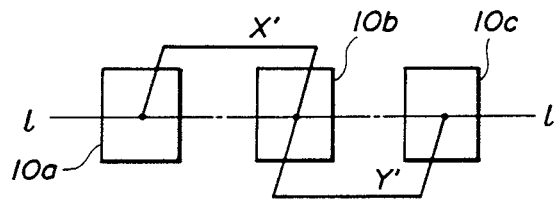
FIG. 4 also explains the configuration of a circuit in which three pieces of the fixed contacts shown in FIG. 1 are used.

Normally, the first and second sliders 3 and 4 are pressed in a direction opposite to that of the arrow in FIG. 1 under the force of the spring 5, so that the moving contacts 6a and 6b are positioned in the places corresponding to X and X' shown in FIGS. 3 and 4. That is, as seen in FIG. 3, the lefthand moving contact 6a is on the substrate 1 while the righthand moving contact 6b is on the lefthand fixed contact 10a with the circuit being "opened". In FIG. 4, the lefthand moving contact 6a is on the lefthand fixed contact 10a while the righthand moving contact 6b is on the central fixed contact 10b, thereby forming a closed circuit X'. At this time, the force of the spring 5 acts on the second slider 4. The spring force is divided into a component which acts perpendicularly on the slope 41 of the slider 4 and a component which acts horizontally on the slope 41, and conveyed to the righthand moving contact 6b. The perpendicularly acting component of the spring force acts as a contact pressure of the righthand moving contact 6b to the substrate 1, while the horizontally acting force component acts as a contact pressure of the righthand moving contact 6b to the lefthand moving contact 6a. The force conveyed from the righthand moving contact 6b to the lefthand moving contact 6a is further divided into a component which acts perpendicularly on the slope 31 of the first slider 3 and a component which acts horizontally on the slope 31. The perpendicularly acting component of the spring force acts as a contact pressure of the lefthand moving contact 6a to the substrate 1.

Next, the means of pressing the projection 30 is moved in the direction of arrow to slide the first and second sliders 3 and 4 in the direction of arrow against the force of the spring 5, thereby rolling the two moving contacts 6a and 6b by means of the first and second sliders 3 and 4 to the positions Y and Y', respectively, shown in FIGS. 3 and 4. Then as shown in FIG. 3, the lefthand moving contact 6a is positioned on the lefthand fixed contact 10a, while the righthand moving contact 6b is positioned on the righthand fixed contact 10b, thereby forming a closed circuit Y. As shown in FIG. 4, the lefthand moving contact 6a is positioned on the central fixed contact 10b while the righthand moving contact 6b is on the righthand fixed contact 10c, thereby switching the closed circuit X' to a closed circuit Y'. At this time, when a force in the direction of arrow is applied to the first slider 3 against the force of the spring 5, it is conveyed to the lefthand and righthand moving contacts 6a and 6b, respectively, reversely following the sequence of the above-mentioned force conveyance and acts as contact pressure of the lefthand and righthand moving contacts 6a and 6b, respectively, to the substrate 1. When contact combination is changed from one to another, the moving contacts 6a and 6b are smoothly moved as rolled and the abrasion between the moving contacts 6a and 6b and the fixed contacts 10a and 10b is less than that with the conventional sliding-type moving contacts.

By removing the pressure of the means of pressing the projection 30, the first and second sliders 3 and 4 and the moving contacts 6a and 6b are returned to their respective initial positions, the circuit shown in FIG. 3 is switched to an opened circuit while the circuit in FIG. 4 is switched from the circuit Y' to Y.

It should be noted that since the moving contacts 6a and 6b of the aforementioned switch unit are in the form of a ball, their contact with the fixed contacts 10a and 10b are a point contact.

Figure 5:
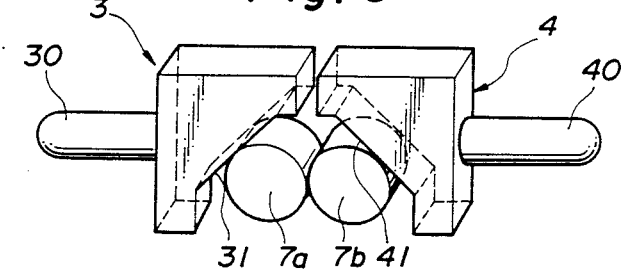
FIG. 5 is a perspective view of the moving contacts showing a variance thereof.

FIG. 5 shows moving contacts 7a and 7b taking the form of a cylinder. These moving contacts are made of an electrically conductive material and have a smooth surface. This cylinder is nearly equal in diameter to the moving contacts 6a and 6b of the aforementioned switch unit and somewhat smaller in height than the width of the space 21.

Figure 6:
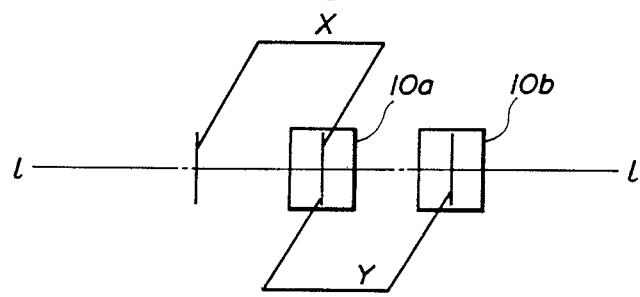
FIG. 6 explains the circuit configuration of a control switch using switch units in each of which the contacts shown in FIG. 5 and two fixed contacts are adopted.
Figure 7:
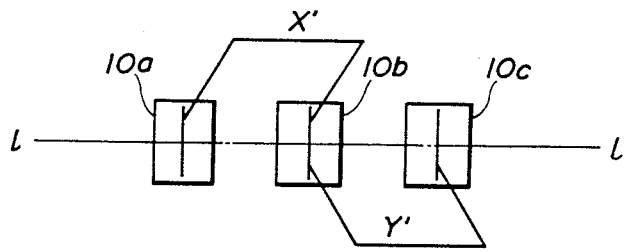
FIG. 7 explains the circuit configuration of control switch composed of switch units each using the moving contacts shown in FIG. 5 and three fixed contacts.

As shown in FIGS. 6 and 7, the switch unit using such cylindrical moving contacts 7a and 7b provides a line contact between the moving contacts 7a and 7b and the fixed contacts 10a, 10b and 10c, and has a similar action and effect to those of the aforementioned switch unit.

Figure 8:
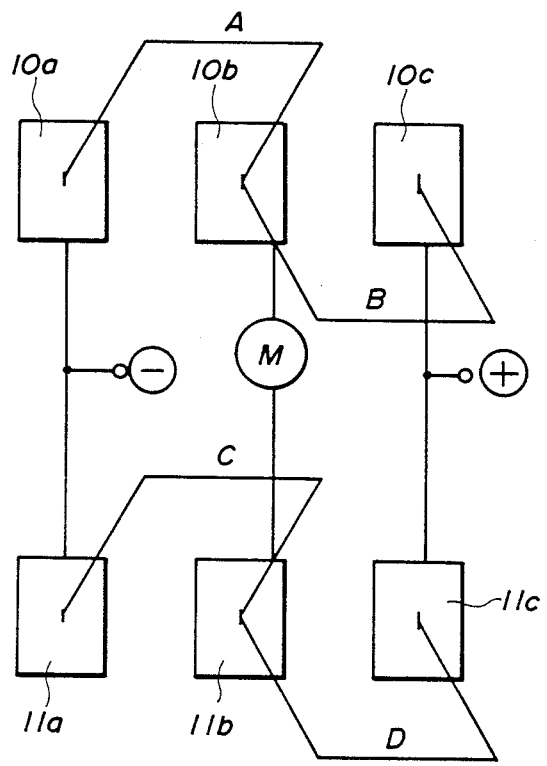
FIG. 8 is a circuit diagram of a control switch formed by two switch units each using three fixed contacts shown in FIG. 1.

FIG. 8 is a diagram of a circuit composed of two sets of switch units each using three fixed contacts and which is intended for reversible run of a motor M.

One of these switch units comprises three fixed contacts 10a, 10b and 10c and two moving contacts 6a and 6b (not shown), and the other switch unit comprises three fixed contacts 11a, 11b and 11c and two moving contacts (not shown).

The lefthand fixed contacts 10a and 11a are connected to the negative pole of the battery, the righthand fixed contacts 10c and 11c are connected to the positive pole of the battery and the central fixed contacts 10b and 11b are connected to the two terminals, respectively, of the motor M.

The two switch units are provided each with a means of pressing the end of their respective first slider (not shown).

In the normal state, the upper switch unit shown forms a closed circuit A by the two moving contacts, while the lower switch unit shown also forms a closed circuit C. Thus, the motor M is connected at both terminals thereof to the negative pole of the battery, so that it is in stopped state.

Next, by pressing the first slider, of the upper switch unit, a closed circuit B is formed. As the lower switch unit maintains the closed circuit C at this time, the positive and negative poles of the battery are connected to both the terminals, respectively, of the motor M, the current flows through the motor M from above to below in Figures so that the motor M runs forwardly. When the force pressing the first slider is removed, the motor is stopped from running.

When the first slider of the lower switch unit is pressed, the closed circuit C is closed. Since the switch unit keeps the closed circuit A at this time, the current flows through the motor M from below to above in Figures so that the motor M runs reversely. When the pressure to the first slider is removed, the motor M is stopped from running.

The aforementioned two sets of switch units may be formed on a same side or on both sides of a same substrate.

FIGS. 9 to 26 show in detail an embodiment of the control switch according to the present invention, in which six sets of switch units are employed to adjust the posture of the surfaces of the automotive right and left mirrors by tilting and pivoting the mirrors.

Figure 9:
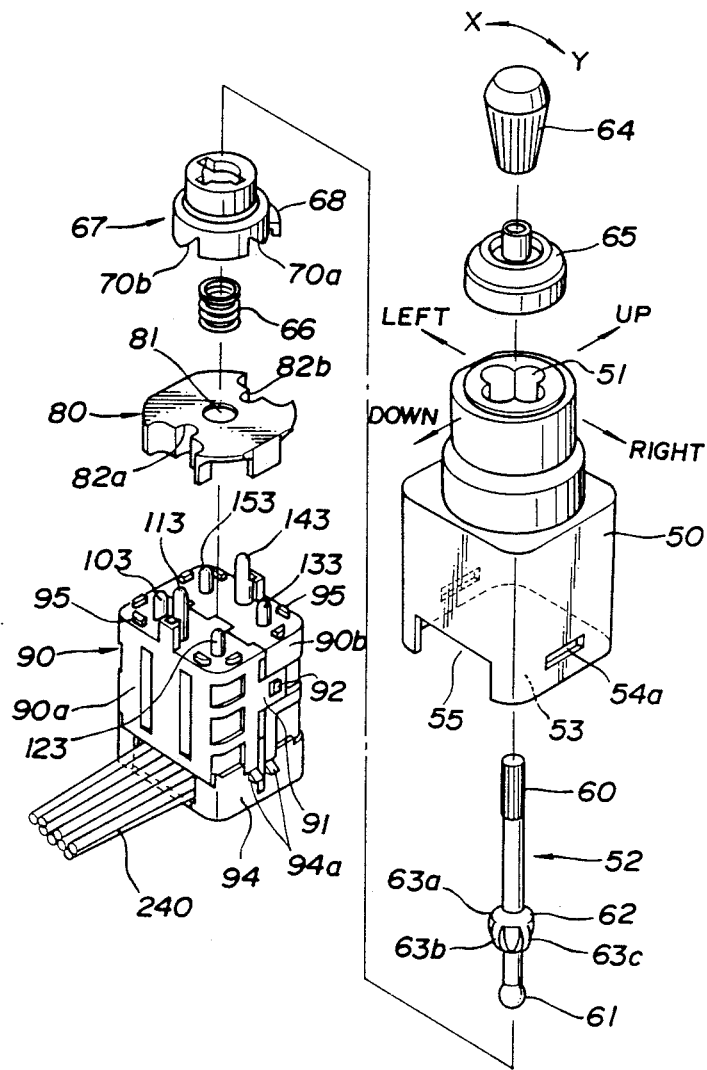
FIG. 9 is an exploded perspective view of the entire control switch showing one embodiment of the control switch according to the present invention, this embodiment being composed of six switch units.

FIG. 9 is an exploded perspective view of the entire control switch.

In FIG. 9, the reference numeral 50 indicates a casing being the control switch body, through which an operating shaft 52 is inserted, and which has a top opening 51 out of which one end of the operating shaft 52 is led and in which the operating shaft 52 can be tilted right-left and to-and-fro, and a bottom opening 53 through which an enclosure 90 can be inserted which houses a substrate 93 on which such control circuits as will be described later are formed. The operating shaft 52 has formed on the upper portion thereof a serration 60 on which an operating knob 64 is securely fixed. In such control switch, the operating shaft 52 is installed rotatably and tiltably with respect to the casing 50. When the operator or driver turns the operating knob 64 by fingers in the direction of arrow X or Y, a control circuit provided to select for posture adjustment either of the mirrors installed at the right and left sides of an automobile is changed for selection of either of the mirrors. The turn of the operating shaft 52 is converted into a rotation of a rotary cam 67. When the operating knob 64 is turned counterclockwise for selection of the left mirror, the turn of the operating shaft 52 is converted into a counterclockwise rotation of the rotary cam 67. This counterclockwise rotation of the rotary cam 67 causes an actuating rod 143 to move in the axial direction of the rotary cam 67. This actuating rod 143 changes the control circuit for adjusting the posture of the surface of the mirror installed at the left side of the car. When the rotary cam 67 is thus rotated clockwise, the actuating rod 113 is caused to move in the axial direction of the rotary cam 67, thereby changing the control circuit for adjustment of the posture of the surface of the mirror installed at the right side.

Figure 10:
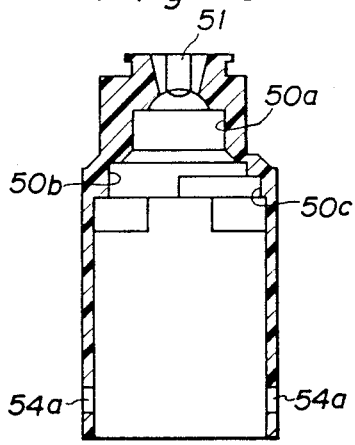
FIG. 10 is an axial sectional view of a casing being the control switch body.

The lower end of the operating shaft 52 is received in a seat 81 formed at the center of a switching disk 80 disposed on the enclosure 90. By tilting the operating knob 64 at the end of the operating shaft 52 in any of the to-and-fro and lateral directions (upward, downward, rightward and leftward), the switching disk is slid in an opposite direction to the tilting direction of the operating shaft 52, whereby any of actuating rod combinations 103 and 123, 133 and 153, 123 and 133, and 103 and 153 are moved downward so that a closed circuit is so formed as to run forwardly or reversely one of two motors provided to tilt or pivot the selected mirror for adjusting the mirror surface. The top opening 51 in the casing 50 is so formed that the operating shaft 52 can be tilted in the to-and-fro and lateral directions (up, down, right and left). To prevent any liquid or dust from entering the casing 50 through the opening 51, a rubber cap 65 is provided on the upper end of the casing 50, and the operating shaft 52 is so passed through a through-hole formed nearly at the center of the cap 65 that the operation of the shaft may not be disturbed. The casing 50 has formed on the upper inner wall thereof a spheric seat 56 adjacent to the lower end of the opening 51 as shown in FIG. 10, and a spheric portion 62 formed on the operating shaft 52 is received by the spheric seat 56. Furthermore, the operating shaft 52 has formed thereon three projections 63a, 63b and 63c formed as contiguous to the spheric portion 62 thereof and it also has formed at the other end thereof a spheric portion 61 which forms an actuating end to displace the switching disk 80. The projections 63a, 63b and 63c are fitted in recesses 67a, 67b and 67c, respectively, formed in the upper end of the rotary cam 67 which is thus rotated as interlocked with the turn of the operating shaft 52. When the operating shaft 52 is tilted upward, downward, rightward or leftward, it can be moved within the recesses 67a, 67b or 67c in the rotary cam 67. Also, since the operating shaft 52 is pressed upward by a compression coil spring 66 provided between the top of the switching disk 80 and the lower ends of the projections 63a, 63b and 63c, the spheric portion 62 abuts the spheric seat 56 under the appropriate resilience of the spring 66, and the spheric portion 61 at the lower end of the operating shaft is received in the spheric seat 81 formed at the center of the switching disk 80 provided on the top of a portion of the enclosure 90, so that the operating shaft 52 can be turned or tilted stably without being shaken in relation to the casing 50.

Figure 12:
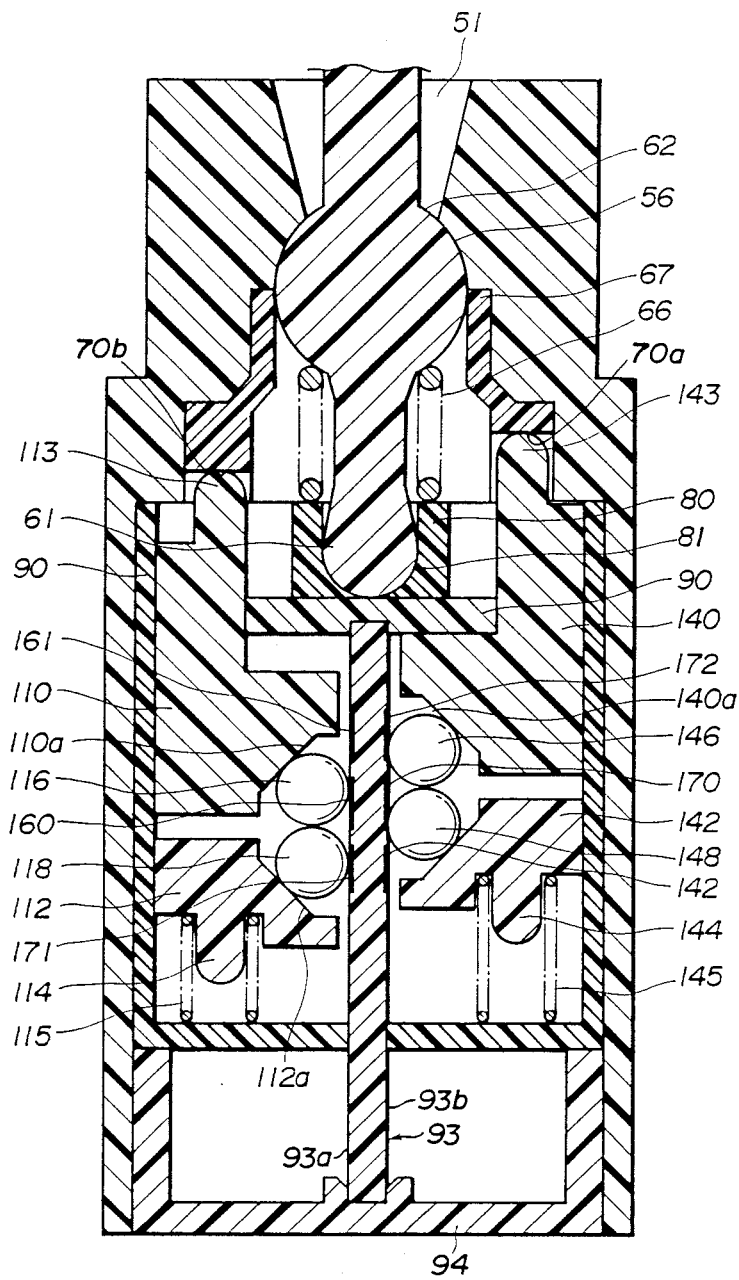
FIG. 12 is a sectional view, enlarged in scale, of the essential parts of the mirror select switch.

FIG. 12 is a sectional view, enlarged in scale, of the essential portions of the switch section according to the present invention which serves to select either of the right and left mirrors.

Figure 14:
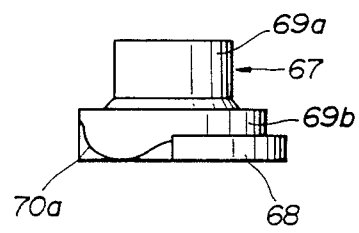
FIG. 14 is a front view of the rotary cam shown in FIG. 13.
Figure 11:
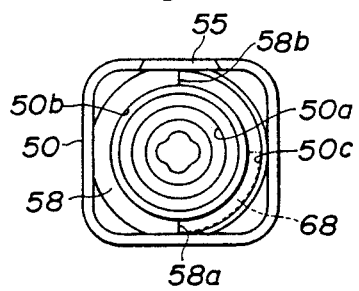
FIG. 11 is a bottom view of the casing shown in FIG. 10.
Figure 15:
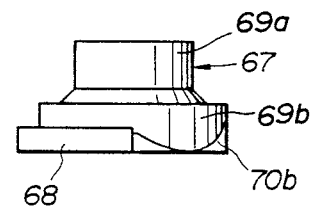
FIG. 15 is a right side elevation of the rotary cam shown in FIG. 13.
Figure 13:
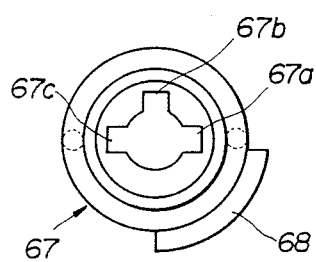
FIG. 13 is a plan view, enlarged in scale, of the rotary cam forming a part of the mirror select switch.
Figure 16:
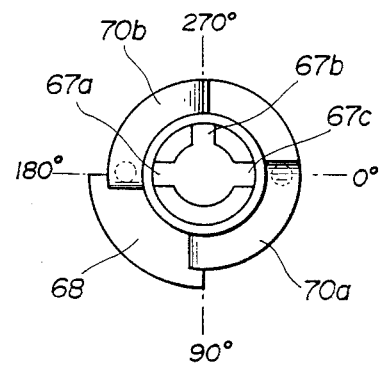
FIG. 16 is a bottom view of the rotary cam shown in FIG. 13.
Figure 17:
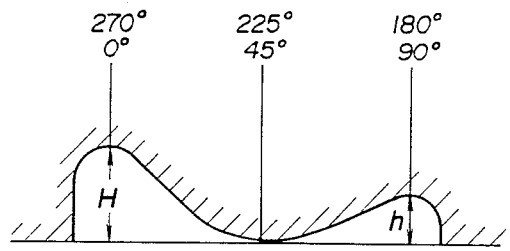
FIG. 17 is a developed illustration explanative of the shapes of slopes in pair formed on the lower side of the rotary cam.
Figure 19:
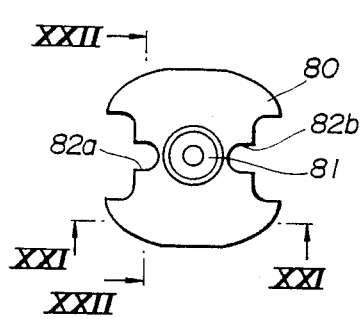
FIG. 19 is a plan view, enlarged in scale, of a switching disk forming a part of the four way switch.

The rotary cam 67 is rotatably installed inside the casing 50, and can be rotated within the casing 50 by turning the operating knob 64. The rotary cam 67 consists of a cylindrical section 69a of a smaller diameter and a cylindrical section 69b of a larger diameter. The cylindrical section 69a has formed in the top thereof the recesses 67a, 67b and 67c having been previously described, and it is in contact, at the circumference thereof, with the inner wall 50a of the casing 50 as shown in FIGS. 10 and 11. Also the cylindrical section 69b is provided with recesses having curved slopes 70a and 70b, respectively, at the lower end thereof, at positions symmetrical with respect to the axis thereof and within ranges of 90 deg. along the circumference thereof. FIG. 13 is a plan view of the rotary cam 67, FIG. 14 is a front view of the rotary cam, FIG. 15 is a right side elevation of the rotary cam and FIG. 16 is a bottom view of the rotary cam. FIG. 17 shows the profiles of the slopes 70a and 70b. As shown in FIG. 17, the slope 70a is cut as greatly curved from the position of 45 deg. toward that of 0 deg. and also cut at the position of 0 deg. to a maximum height H from the lower end of the cylindrical section 69b. Furthermore, the slope 70b is cut as gently curved from the position of 45 deg. toward that of 90 deg. and also cut at the position of 90 deg. to a height h (H is larger than h) from the lower end of the cylindrical section 69b. Also as shown in FIG. 17, the slope 70b is cut as greatly curved from the position of 225 deg. toward that of 270 deg. and also cut at the position of 270 deg. to a maximum height H from the lower end of the cylindrical section 69b. Further, the slope 70b is cut as gently curved from the position of 225 deg. to that of 180 deg. and also cut at the position of 180 deg. to a height h (H is larger than h) from the lower end of the cylindrical section 69b. As shown, an outer flange 68 of a somewhat larger diameter than that of the cylindrical section 69b is formed along the outer circumference of the lower end of the cylindrical section 69b as well as between the position of 90 deg. and that of 180 deg. The outer circumference of this outer flange 68 is in contact with the inner wall 50c of the casing 50, and is rotated while in contact with the inner wall 50c when the rotary cam 67 is rotated in relation to the casing 50. The rotation of the rotary cam 67 is limited to a range of 90 deg. by the opposite ends of a semicircular step 58 formed inside the casing 50. In FIG. 11, the position of the outer flange 68 of the rotary cam 67 is indicated with dotted line. When the rotary cam 67 is at the first angular position, one end of the outer flange 68 is in contact with one end 58a of the step 58, and when the rotary cam is rotated through 90 deg. from the first angular position to the second angular position, the other end of the outer flange 68 comes into contact with the other end 58b of the step 58. Thus, the rotary cam is so constructed as to be rotatable through an angle of 90 deg. around the axis. The actuating ends, namely, the actuating rods 143 and 113, of the actuating members or sliders 140 and 110, respectively, are in contact with the slopes 70a and 70b, respectively. These actuating rods 143 and 110 are so arranged as to be normally pressed to the slopes 70a and 70b, respectively, by compression coil springs 145 and 115, respectively. In FIG. 12, the actuating rod 143 takes a position corresponding to the maximum height H of the cut of the slope 70a, while the actuating rod 113 is in a position corresponding to the height h of the cut of the slope 70b. This state is one when the operating knob 64 is turned in the direction of arrow Y, namely, clockwise, and in this state the outer flange 68 of the rotary cam 67 takes the first angular position shown with dotted line in FIG. 11. When the operating knob 64 is turned through 90 deg. from this position in the direction of arrow X, namely, counterclockwise, the actuating rod 143 is pressed downward from the position corresponding to the maximum cut height H against the force of the spring 145 while being in contact with the slope 70a. When the rod has been pressed downward for the height H, it is pressed upward under the force of the spring 145 and held at a position corresponding to the cut height h. At this time, the actuating rod 113 is pressed downward from the position corresponding to the cut height h against the force of the spring 115. When it has been pressed downward for the height h, the rod 113 is pressed upward under the force of the 115 and held at a position corresponding to the maximum cut height H. In this state, the outer flange 68 of the rotary cam 67 takes the second angular position which is attained by a rotation through 90 deg. from the first angular position shown with dotted line in FIG. 11.

The rotation of the rotary cam 67 is converted into a movement of the actuating end in the direction of the axis of rotation, namely, into a linear movement.

Figure 18:
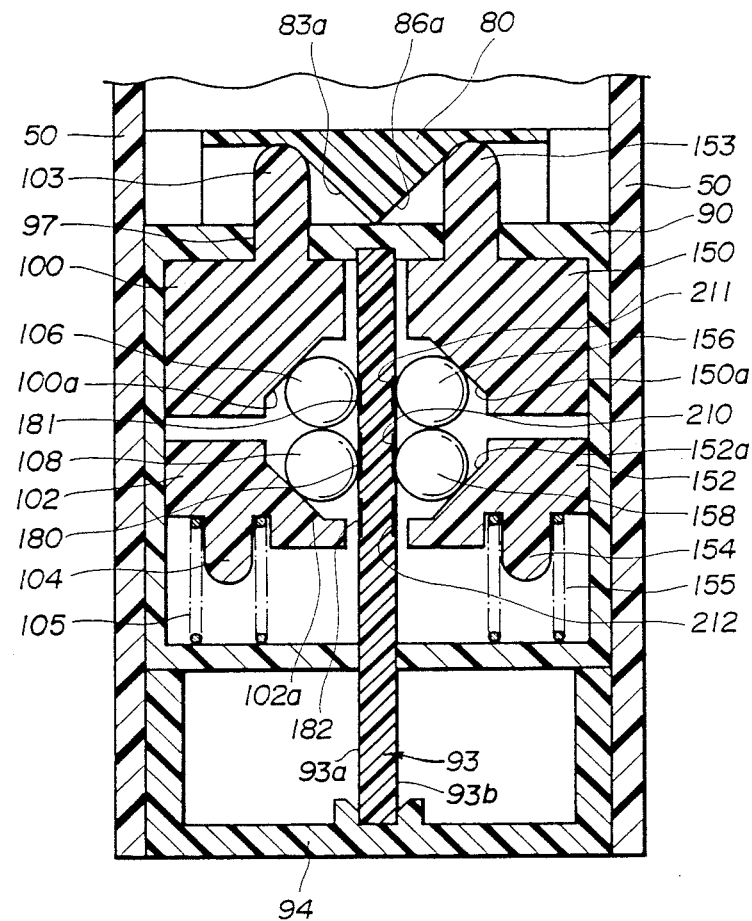
FIG. 18 is a sectional view, enlarged in scale, of the essential parts of the four-way posture control switch to tilt or pivot the mirror surface.

FIG. 18 is a sectional view, enlarged in scale, of the essential parts of the four-way switch unit composing the control switch and provided to adjust the mirror surface by tilting or pivoting either of the right and left mirrors.

Normally, the switching disk 80 is supported on the ends of four actuating rods 103, 123, 133 and 153 (among them, 103 and 153 are illustrated in Figure). The shape of the switching disk 80 is shown in detail in FIGS. 19 to 22. As having been explained in the foregoing, the switching disk 80 has formed in the top thereof the special seat 81 in which a spheric portion 61 formed at the lower end of the operating shaft 52 is received, and on the bottom thereof slopes to vertically move any corresponding actuating rods when the switching disk 80 is slid in an opposite direction to a direction of upward, downward, rightward or leftward tilt of the operating shaft 52. This will be described in further detail below.

The switching disk 80 has formed in the opposite sides thereof vertical cuts 82a and 82b so that the disk 80 can slide without being in contact with the actuating rods 113 and 143. In practice, the enclosure 90 consists of a lefthand enclosure subassembly 90a and righthand enclosure subassembly 90b. The actuating rods 113 and 143 are disposed in the lefthand subassemblies 90a and 90b, respectively, and they are guided for vertical movement by guide members 98a and 98b formed integrally with the top of the lefthand and righthand subassemblies 90a and 90b and in which guide recesses are formed. Therefore, the cuts 82a and 82b in the switching disk 80 are formed in such a shape that they will not be in contact with the actuating rods 113 and 143 as well as with the guide members 98a and 98b.

Figure 21:
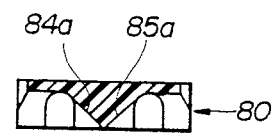
FIG. 21 is a sectional view taken along the lines XXI—XXI in FIG. 19.
Figure 20:
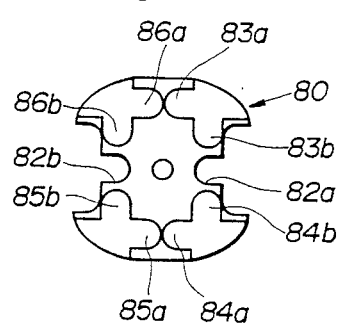
FIG. 20 is a bottom view of the operating disk shown in FIG. 19.
Figure 22:
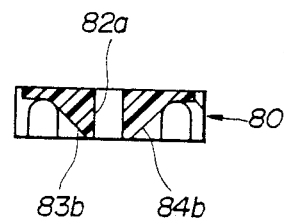
FIG. 22 is a sectional view taken along the lines XXII—XXII of FIG. 19.

As shown in detail in FIGS. 20 to 22, the switching disk 80 has formed on the rear side thereof slopes 83a and 83b; 84a and 84b; 85a and 85b; and 86a and 86b correspondingly to the actuating rods 103, 123, 133 and 153, respectively. The slopes 83a, 84a, 85a and 86a are provided correspondingly to the upward and downward directions, respectively, as shown in FIG. 20, while the slopes 83b, 84b, 85b and 86b are provided correspondingly to the leftward and rightward directions. As shown in FIGS. 21 and 22, these slopes are at an angle of about 45 deg. While the switching disk 80 is in the normal state, the ends of the actuating rods 103, 123, 133 and 153 are in contact with and support the switching disk 80 at the positions where two corresponding slopes intersect each other. The reference numeral 95 indicates a projection extending in the direction of the substrate 93 and which limits the sliding range of the switching disk 80.

By tilting the operating knob 64 frontwardly, namely, in the upward direction in FIG. 9, the spheric portion 61 formed at the lower end of the operating shaft 52 slides the switching disk 80 rearwardly, namely, in the downward direction in FIG. 9, whereby the slopes 83a and 84a depress the actuating rods 103 and 123. Since the actuating rods 103 and 123 are always pressed upwardly by the compression coil springs 105 and 125, the switching disk 80 is returned to its initial position when the force applied to tilt the operating knob 64 is reduced.

Similarly, by tilting the operating knob 64 in the downward, leftward or rightward direction in FIG. 9, the actuating rods 133 and 153; 123 and 133, or 103 and 153 are pushed down.

The actuating rods 103, 113, 123, 133, 143 and 153 of the aforementioned mirror select switch unit and the four-way switch unit are formed in the shape of protruding ends of the first sliders 100, 110, 120, 130, 140 and 150 slidably disposed within the enclosure 90, said end being protruding outside from one end of each of the sliders through the through-hole 97 formed in the top of the enclosure 90.

Figure 23:
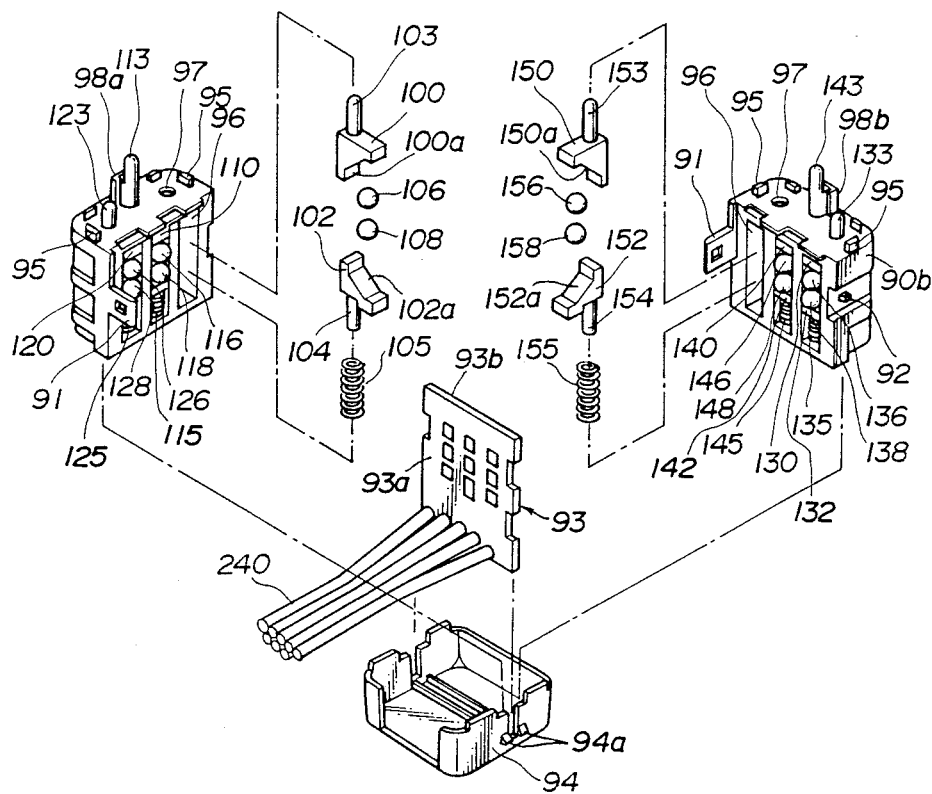
FIG. 23 is an exploded perspective view showing in detail the construction of a control switch comprising six switch units shown in FIG. 9.

In FIG. 23, the first sliders 100 and 150 on which the actuating rods 103 and 153 are formed, respectively, are shown as split. The first sliders 100, 110 and 120 are disposed in a rectangular box-shaped chamber 96 defined in the lefthand enclosure subassembly 90a, while the first sliders 130, 140 and 150 are in such a chamber 96 in the righthand subassembly 90b. There are disposed in the positions within each chamber 96 which are opposite to the first sliders the second sliders 102, 112, 122, 132, 142 and 152, respectively. All these sliders are made of an electrically conductive material.

The first slider 100 and second slider 102 have formed on the respective sides thereof opposite to each other slopes 100a and 102a, respectively, of which the slope 100a is a flat one extending upward at an angle of about 45 deg. while the slopde 102a is also a flat one extending downward at an angle of about 45 deg. The first and second sliders 100 and 102 can be slid within the chamber 96 with the rear side thereof being in contact with the bottom surface of the chamber 96 and with the lateral sides of the slopes 100a and 102a thereof being in contact with the side walls of the chamber 96. The projection 104 extending downward from the bottom of the second slider 102 has fitted thereon a compression coil spring 105 of which the one end is received on the bottom of the second slider 102 and the other end is on the lower end of the chamber 96. The first and second sliders 100 and 102 have their respective front ends directed toward the lefthand surface 93a of the substrate 93 on which the fixed-contact groups are mounted which will be described later. There are housed in a space defined by the slopes 100a, 102a and the substrate surface 93a two small ball-shaped, electrically conductive moving contacts 106 and 108 in pair which are in contact with each other and also with the slopes 100a and 102a as well as with the substrate surface 93a. Therefore, in the normal state, the second slider 102 is pressed upward under the force of the compression coil spring 105, the moving contact 108 is pressed by the second slider 102 to the substrate surface 93a and it gives the moving contact 106 an upward force. Furthermore, the moving contact 106 gives the first slider 100 an upward force, and thus the first slider 100 is forced to the upper end face of the chamber 96 with the actuating rod 103 being protruded outside through the through-hole 97. In this state, the moving contacts 106 and 108 are in contact with the fixed contacts 181 and 180, respectively, formed in line on the substrate surface 93a (first switching position).

When the actuating rod 103 is pushed down, the first slider 100, pair of moving contacts 106 and 108 and the second slider 102 are moved downward against the upward force of the compression coil spring 105 while their geometrical relation is kept unchanged, so that the moving contacts 106 and 108 get into contact with the fixed contacts 180 and 182, respectively (second switching position). When the downward pressure of the actuating rod 103 is removed, the moving contacts 106 and 108 are returned to their initial positions under the force of the compression coil spring 105 and thus get into contact with the fixed contacts 181 and 180. This is also true with the other first and second sliders and other compression coil springs. The aforementioned first and second sliders 100 and 102 form together a first actuating member, while the other first sliders 120, 130 and 150 and other second sliders 122 (hidden by arm 91), 132 and 152 form the second, third and fourth actuating members, respectively. The first slider 110 and second slider 112 form together a fifth actuating member, and the first slider 140 and second slider 112 form together a sixth actuating member. The first to fourth actuating members belong to the four-way switch unit, while the fifth and sixth actuating members are provided for the mirror select switch unit according to the present invention. Also, each of the aforementioned chambers is so constructed as to guide the actuating members in the direction of the fixed contact rows. The front ends of the sliders which form the first, second and fifth actuating members are disposed as directed toward the left substrate surface 93a of the substrate 93, while the front ends of the sliders composing the third, fourth and sixth actuating members are disposed as directed toward the right substrate surface 93b of the substrate 93. The moving direction of all such first to sixth actuating members is parallel with the surface of the substrate 93 on which the groups of fixed contacts are formed. This moving direction is the same as that of the moving contacts corresponding to the actuating members.

Also, the lefthand enclosure subassembly 90a in which the first, second and fifth actuating members are housed, and the righthand enclosure subassembly 90b housing the third, fourth and sixth actuating members are fixed to each other with the substrate 93 placed between them by engaging the pawl 92 formed on each subassembly into a small hole in an arm 91 of each subassembly. The lower portion of the substrate 93 is supported in a holder 94. Pawls 94a formed protruding on the opposite sides of the holder 94 are engaged on the edges of small square holes 54a formed in the lower portion of the casing 50, whereby the enclosure 90 is secured to the casing 50.

Figure 24:
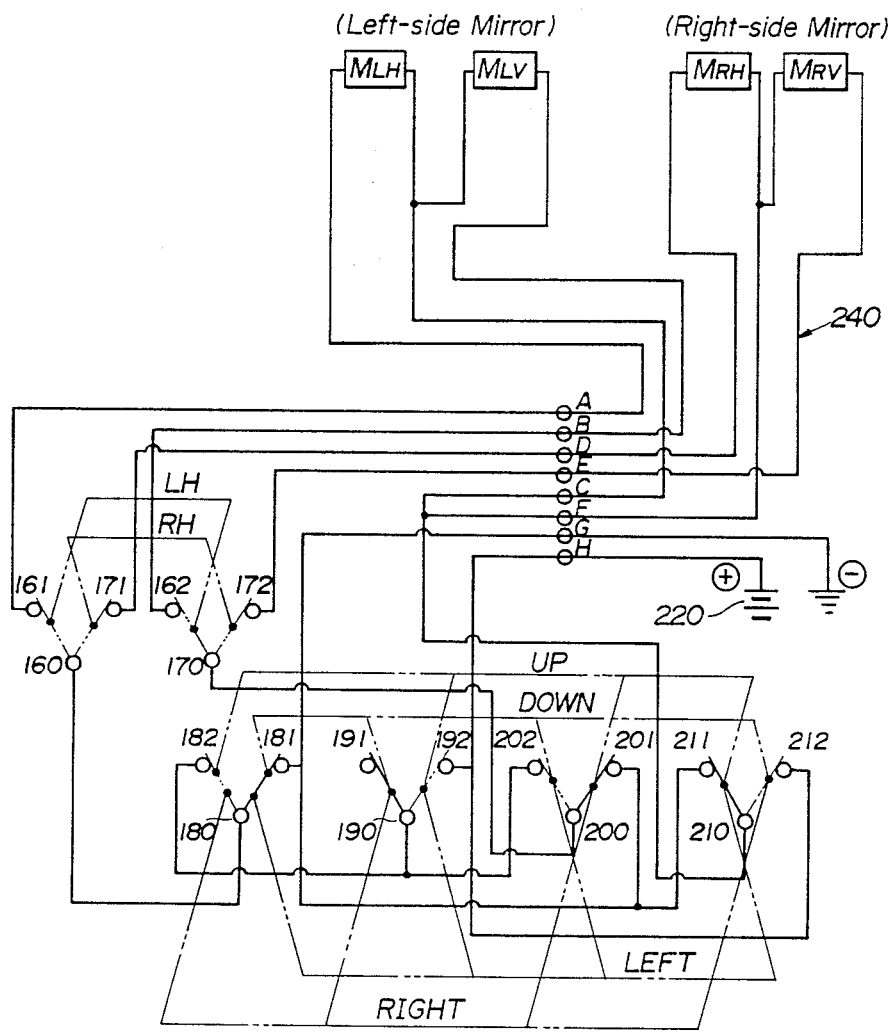
FIG. 24 is a circuit diagram of the control switch shown in FIG. 23.
Figure 25A:
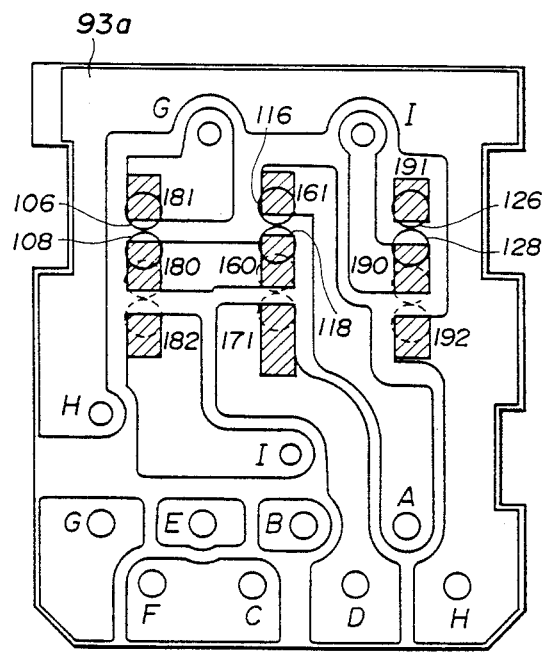
FIGS. 25(a) and 25(b) show the circuit patterns, respectively, formed on the respective sides of the PCB according to the circuit diagram shown in FIG. 24, in which the positions of the fixed contacts and those of the corresponding moving contacts.
Figure 25B:
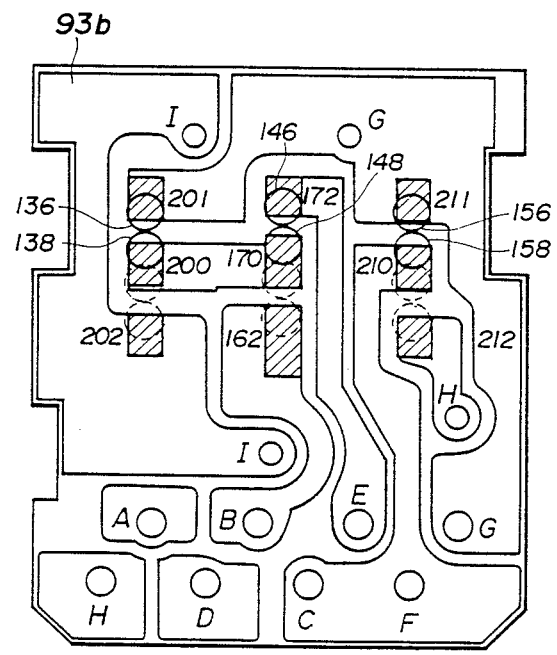

FIGS. 25(a) and 25(b) show detail wiring patterns, respectively, illustrative of the connected relation between the fixed contact groups and aforementioned moving contact groups formed on the lefthand and righthand surfaces 93a and 93b, respectively, of the substrate 93. FIG. 24 diagramatically shows a mirror posture control circuit configured using the wiring patterns.

There are disposed on the lefthand surface 93a of the substrate fixed contacts 181, 180 and 182 in line correspondingly to the first actuating member. Similarly, the fixed contacts 161, 160 and 171 are disposed in line correspondingly to the fifth actuating member, and the fixed contacts 191, 190 and 192 are disposed in line correspondingly to the second actuating member.

There are disposed in line fixed contacts 201, 200 and 202 correspondingly to the third actuating member, 172, 170 and 162 correspondingly to the sixth actuating member, and 211, 210 and 212 correspondingly to the fourth actuating member.

The terminal A is connected to one of the terminals of a motor MLH which tilts around the horizontal axis the lefthand mirror of an automobile body as shown in FIG. 24, the terminal B is connected to one of the terminals of a motor MLV which pivots the same mirror around the vertical axis, and the terminal C is connected to a common terminal of the motors MLH and MLV.

Similarly, the terminals D and E are connected to one of the terminals of motors MRH and MRV located at the right side of the automobile body, and the terminal F is connected to a common terminal of the motors MRH and MRV.

The terminal G s connected to the grounding potential, while the terminal H is connected to the positive pole of a battery 220. The wires to and from these terminals A to H are indicated with a reference numeral 240 in FIG. 23.

Further, the terminal A is connected to the fixed contact 161, the terminal B is to the fixed contact 162, the terminals C and F are to the fixed contact 210, the terminal D is to the fixed contact 171, the terminal E is to the fixed contact 172, the terminal G is to the fixed contacts 181, 201 and 211, and the terminal H is to the fixed contacts 192 and 212, respectively.

The fixed contacts 160 and 180 are connected to each other, the fixed contacts 170 and 200 are connected to each other, and the fixed contacts 182, 190 and 202 are connected to one another.

As shown in FIGS. 25(a) and 25(b), the moving contacts 106 and 108; 116 and 118; 126 and 128; 136 and 138; 146 and 148; and 156 and 158 are normally in the positions indicated with solid lines, and when they are moved by their respective actuating members, they take the positions indicated with dotted lines.

The control circuit constructed with such fixed and moving contact groups function as will be explained herebelow: First, to adjust the posture of the surface of the lefthand mirror, the operating knob 64 is turned in the direction of arrow X. The rotary cam 67 is rotated counterclockwise, and at this time, since the slope 70a changes from the position of cut height H to that of h as having been previously described, the actuating rod 143 is pushed down by the slope. Thus, the first slider 140, pair of moving contacts 146 and 148 and the second slider 142 forming together the sixth actuating member are moved downward with the geometrical relation kept unchanged, the moving contacts 146 and 148 are connected with the fixed contacts 170 and 162, respectively, and these fixed contacts 170 and 162 are electrically connected to each other. In this state, the fixed contacts 160 and 161 formed on the lefthand surface 93a of the substrate 93 are in contact with the moving contacts 116 and 118, so that these fixed contacts 160 and 161 are electrically connected to each other. This state corresponds to a state when the line LH is shifted to the left as shown in FIG. 24.

In this state, when it is desired to tilt up the surface of the lefthand mirror, the operating knob 64 has to be tilted upward (to that side). Since the spheric portion 61 formed at the lower end of the operating shaft 52 is thus pivoted, the switching disk 80 is slid downward (to this side) so that the slopes 83a and 84a of the switching disk 80 push down the actuating rods 102 and 123 as having been described previously, whereby the first and second actuating members are operated. In this way, the moving contacts 106 and 108, and 126 and 128 are moved from the position indicated with solid line to a position indicated with dash line in FIG. 25(a), so that the fixed contacts 180 and 182, and 190 and 192 are electrically connected to each other, respectively. At this time, the fixed contact 200 is electrically connected to the fixed contact 201, and also the fixed contact 210 is to the fixed contact 211, so that only the terminal A connected to one of the terminals of the motor MLH goes positive, while the terminal B connected to one of the terminals of the motor MLV and the terminal C connected to the common terminal of the motors MLH and MLV are connected to the ground potential. Also, the terminal D connected to one of the terminals of the motor MRH which tilts the righthand mirror surface and the terminal E connected to one of the terminals of the motor MRV are not electrically connected, while the terminal F connected to the common terminal of the motors MRH and MRV is kept at the ground potential. Therefore, a current flows through the motor MLH from the terminal A toward the terminal C, so that the motor MLH will run forward to tilt up the lefthand mirror. By reducing the force to tilt the operating knob upward (to that side), the switching disk 80 returns to its initial position and also the terminal A is connected to the ground potential, so that the motor MLH is stopped from running.

When it is desired to tilt down the lefthand mirror, pivot it leftward or rightward, the operating knob 64 has to be tilted downward (to this side), leftward or rightward. For such posture adjustment, the switching disk 80 is slid in any of the upward, rightward and leftward directions, and pushes down the actuating rods 133 and 153; 123 and 133 or 103 and 153, thereby operating any of the second and third actuating members, third and fourth actuating members, and fourth and first actuating members. When an operation for tilt-down of the mirror surface is done, the terminal A is connected to the ground potential and the terminals C and F have a positive potential, so that a current flows through the motor MLH from the terminal C toward the terminal A, thus the motor MLH runs reversely. For leftward or rightward pivot of the mirror surface, a current flows through the motor MLV from the terminal B to the terminal C or from the terminal C to the terminal B, so that the motor MLV runs forward or reversely.

Also for adjustment of the surface of the righthand mirror, the operating knob 64 is turned in the direction of arrow Y, and the same procedure for the lefthand mirror is taken. Thus, the posture of either of the righthand and lefthand mirrors can be adjusted.

FIG. 26 shows the connected relation between the terminals. The table in this Figure will provide for a better understanding of the contact switching of the control circuit shown in FIG. 24.

In the embodiment of control switch having been described in the foregoing, plural moving contacts are formed in the shape of balls, but they may be formed in the shape of cylinders. In case of the ball-shaped moving contacts, they have substantially a point contact with the fixed contacts, while the cylindrical moving contacts have substantially a line contact with the fixed contacts. These kinds of contact result in only a very small abrasion as compared with the push plate type switch in which there occurs a surface contact between the moving and fixed contacts. In the embodiment, each fixed contact group consists of three fixed contacts, but two fixed contacts can be used to form each fixed contact group, and also more than four fixed contacts may be employed in each fixed contact group. Namely, any number of fixed contacts may be used in each group of fixed contacts Further, the switch to select either of the righthand and lefthand mirrors for posture adjustment and the four-way switch to tilt or pivot the mirror surface are operated inpendently of each other. Such operations can be done by turning or tilting a single operating shaft common to them, so that the operator has only to handle a same operating shaft, namely, an operating knob. This means that the driver can drive his car safely without paying much attention to the operation of the control switch when necessary during driving.

Further, the actuating members are formed in such a shape that two independent sliders are in contact with each other with moving contacts in pair surrounded by them. However, they are not limited to such form, but they may be formed in a single slider if it could roll the pair of moving contacts along the substrate surface.

Moreover, the two sets and four sets of fixed contact groups composing the mirror select switch and four-way switch, respectively, may be formed in one set and two sets on the front and rear sides, respectively, of the substrate and the moving contact groups corresponding to the fixed contact groups can be formed very compact as compared with the bridge-shaped moving contacts used in the push plate type control switch. Thus, each of the actuating members can be formed as reduced in length in the direction along the substrate surface. Thus, since the cross section of the casing generally depends upon the thickness of the substrate and that of the actuating members in a direction perpendicular to the substrate, the control switch itself can be designed very compact as compared with the push plate type control switch. This control switch according to the present invention can be installed in practice with the casing buried in the dashboard, arm rest or console in an automobile and only the operating shaft and rubber cap are exposed outside, so no dust or liquid can enter the switch.

What is claimed is:

1. A remote control switch for posture adjustment of automotive mirrors, comprising:
   at least two fixed contacts disposed in a row on a surface of a substrate housed in a casing;
   a pair of moving contacts movably disposed on said substrate and which comprise two electrically-conductive rolling elements;
   actuating means for moving said moving contact pair while keeping them in contact with each other;
   means for guiding said actuating means in the direction of said row;
   resilient means for forcing said actuating means in a predetermined direction to retain said fixed contacts and moving contacts in a first contact position;
   operating means for moving said actuating means in an opposite direction to the direction of a force of said resilient means;
   said fixed contacts and moving contacts taking a second contact position when said actuating means is moved in the opposite direction by said operating means; and
   said actuating means being formed as two sliders having slopes which have a contact with one of said moving contacts.

2. A remote control switch according to claim 1, wherein said fixed contacts are provided three each in number and said moving contact pair is in contact with a first and second one of said fixed contacts when in said first contact position, while in said second contact position said moving contact pair is in contact with the second and a third one of said fixed contacts, respectively.

3. A remote control switch for posture adjustment of automotive mirrors, comprising:
- two sets of fixed contact groups each consisting of at least two fixed contacts, disposed in rows on both sides, respectively, of a substrate housed in a casing;
- two sets of moving contact pairs movably disposed on said substrate correspondingly to each of said fixed contact groups and which include two electrically-conductive rolling elements;
- two actuating members disposed correspondingly to each of said moving contact pairs and which move each of said moving contact pairs while keeping them in contact with each other;
- two means for guiding said actuating members in the direction of each of said rows of said fixed contact groups;
- two resilient members to force each of said actuating members in predetermined directions, respectively, in such a manner that each of said moving contact pairs and fixed contacts forming each of said fixed contact groups are put into a first contact position;
- a rotary cam having an axis of rotation parallel to the direction of said rows, rotatably disposed within said casing and which acts on each of said actuating members to move it against the force of said resilient members so that each of said moving contact pairs and fixed contacts composing each of said fixed contact groups take a second contact position; and
- an operating shaft rotatably installed to said casing to rotate said rotary cam;
- said rotary cam having formed along the circumference thereof first and second recesses each having a curved slope, correspondingly to said two actuating members, said recesses being so formed as to move said actuating members alternately according to the turned direction of said operating shaft.

4. A remote control switch according to claim 3, wherein said first and second recesses are formed in positions symmetrical with respect to the axis of rotation and each over a substantial quarter of the outer circumference of said rotary cam, one end of said first recess and that of said second recess located symmetrically with respect to said axis of rotation corresponding to said first and second contact positions, respectively, the other end of said first recess and that of said second recess being disposed correspondingly to said first and second contact positions, respectively.

5. A remote control switch according to claim 4, wherein said rotary cam has provided circumferentially thereof a stop to limit the angle of rotation to substantially 90 deg.

6. A remote control switch for posture adjustment of automotive mirrors, comprising:
- four sets of fixed contact groups each including at least two fixed contacts, disposed on both sides, respectively, of a substrate housed in a casing, two of said four sets being provided on one side of said substrate while the other two sets are disposed on the other side;
- four sets of moving contact pairs movably disposed on said substrate correspondingly to each of said fixed contact groups and each including two electrically-conductive rolling elements;
- four actuating members disposed correspondingly to each of said moving contact pairs and which are used to move each of said moving contact pairs while keeping them in contact with each other;
- four means for guiding said actuating members in the direction of the rows of each of said fixed contact groups;
- four resilient members to force said actuating members in a predetermined direction in such a manner that each of said moving contact pairs and fixed contacts-composing each of said fixed contact groups take a first contact position;
- a switching disk disposed in a plane substantially perpendicular to said substrate and received on actuating ends protruding from each of said actuating members in the direction of the force of said resilient members;
- an operating shaft disposed tiltably and rotatably in relation to said casing and having one end thereof supported in a seat formed at the center of said switching disk to slide said switching disk when said shaft is tilted;
- said switching disk having formed therein plural slopes to move any two sets of adjoining actuating ends correspondingly to any of the upward, downward, rightward and leftward tilting operations, thereby having each of said moving contact pairs corresponding to said actuating ends and fixed contacts composing each of said fixed contact groups take a second contact position.

7. A remote control switch for posture adjustment of automotive mirrors, comprising:
- three sets of fixed contact groups each composed of a first, second and third fixed contacts disposed in a longitudinal direction in a row on one side of a substrate and which are parallel to each other;
- another three sets of fixed contact groups disposed on the other side of said substrate in positions symmetrical with said three sets of fixed contact groups;
- six sets of moving contact pairs disposed correspondingly to said six sets of fixed contact groups, respectively, and movable in said longitudinal direction and each of which consists of two electrically-conductive rolling elements;
- six actuating members so disposed as to keep said moving contact pairs in contact with each other and to move them in said longitudinal direction;
- six resilient members so disposed as to force each of said actuating members longitudinally in such a manner that each of said moving contact pairs takes a first contact position where it is in contact with the first and second ones of three fixed contacts composing each of said fixed contact groups;
- a left half enclosure having chambers which house three of said six actuating members and three of said six resilient members, respectively, and which is fixed on said one side of said substrate;
- a right half enclosure having chambers which house the other three of said six actuating members and also the other three of said six resilient members, respectively, and which is fixed on said other side of said substrate;
- said left and right half enclosures forming together a box-shaped inner casing, and an actuating end of each of said actuating members which is protruded in a direction in which it is forced by each of said resilient members being exposed outside of a corresponding one of said enclosures;

a switching disk disposed slidably on a surface of said inner casing in a plane substantially perpendicular to said substrate and having slopes corresponding to the actuating ends, respectively, of two of the three actuating members housed in the left half enclosure fixed to said one side of said substrate and also of two of the three actuating members housed in the right half enclosure fixed to the other side of said substrate;

said slopes being so formed that each actuating end of the two of said four actuating members is moved against the force of a corresponding one of said resilient members due to the sliding of said switching disk in a direction perpendicular to said substrate and in a lateral direction of the substrate so that corresponding ones of said moving contact pairs take a second contact position where they are in contact with second and third fixed contacts of said three sets;

an outer casing which houses said inner casing and switching disk;

a rotary cam having an axis of rotation parallel to said longitudinal direction, rotatably disposed within said outer casing and having formed therein first and second curved recesses corresponding to each of the actuating ends, respectively, of the rest of said three actuating members which are housed in said left half enclosure and that of said three actuating members housed in said right half enclosure, each of said recesses being formed to move said actuating ends alternately so that each of said actuating ends is moved against the force of said corresponding resilient members whereby said corresponding moving contact pairs take a second contact position when they are in contact with said second and third fixed contacts of said other three sets; and an operating shaft installed tiltably and rotatably to said outer casing, of which one end is formed as an operating knob protruding outside of said outer casing while the other end is formed as an operating end which slides said switching disk;

said rotary cam being so formed as to be rotated when the operating shaft is turned and not to interfere with the tilting of said operating shaft in the tiltable range of said operating shaft.

8. A remote control switch according to claim 7, wherein said first and second recesses are formed in positions, respectively, symmetrical with respect to the axis of rotation and over substantial quarters, respectively, of an outer circumference of said rotary cam, one end of said first recess and that of said second recess corresponding to said first and second contact positions, respectively, since these ends are in positions symmetrical with respect to the axis of rotation, the other ends of said first and second recesses being disposed correspondingly to said second and first contact positions.

9. A remote control switch according to claim 8, wherein said rotary cam has provided circumferentially thereof a stop to limit the angle of rotation to substantially 90 deg.

10. A remote control switch according to claim 7, wherein a portion of said outer casing at which said operating shaft is protruded outside is provided with a soft rubber cap which will not interfere with the movement of the operating shaft.

* * * * *